United States Patent
Kumakura et al.

[19]

[11] Patent Number: 5,828,309

[45] Date of Patent: Oct. 27, 1998

[54] POWER SOURCE MISWIRING DETECTION APPARATUS

[75] Inventors: Masayuki Kumakura; Eiji Oohashi, both of Ooizumimachi, Japan

[73] Assignee: Sanyo Electric Co., Ltd., Osaka, Japan

[21] Appl. No.: 630,043

[22] Filed: Apr. 2, 1996

[30] Foreign Application Priority Data

Apr. 17, 1995 [JP] Japan .................................. 7-115175

[51] Int. Cl.⁶ .................................................. G08B 21/00
[52] U.S. Cl. ............................ 340/658; 340/635; 324/66; 324/76.77; 307/127; 307/129; 307/138; 361/85; 361/23
[58] Field of Search ..................................... 340/658, 635; 324/76.77, 66, 108, 511; 307/326, 127, 129, 138; 361/85, 23

[56] References Cited

U.S. PATENT DOCUMENTS

Re. 33,874   4/1992   Miller ........................................ 361/79
4,119,910   10/1978   Hayashi .................................. 324/83 R
5,184,063   2/1993   Eisenhauer ................................ 324/86

FOREIGN PATENT DOCUMENTS 0845114   10/1981   U.S.S.R. .

*Primary Examiner*—Thomas Mullen
*Assistant Examiner*—Julie B. Lieu
*Attorney, Agent, or Firm*—Darby & Darby

[57] ABSTRACT

A power source miswiring detection apparatus for detecting a miswiring of wires of a power source, including a pulse generator for generating a first pulse having a pulse width corresponding to a first phase difference between a first pair of two phases of a three-phase alternating power source, and a second pulse having a pulse width corresponding to a second phase difference between a second pair of two phases of the three-phase alternating power source which is different from the first pair of two phases, and a microcomputer for detecting a third phase difference between the first pulse and the second pulse to judge whether the third phase difference is in a predetermined range, and detecting the miswiring if the third phase difference is judged to be out of the predetermined range.

6 Claims, 4 Drawing Sheets

FIG. 2
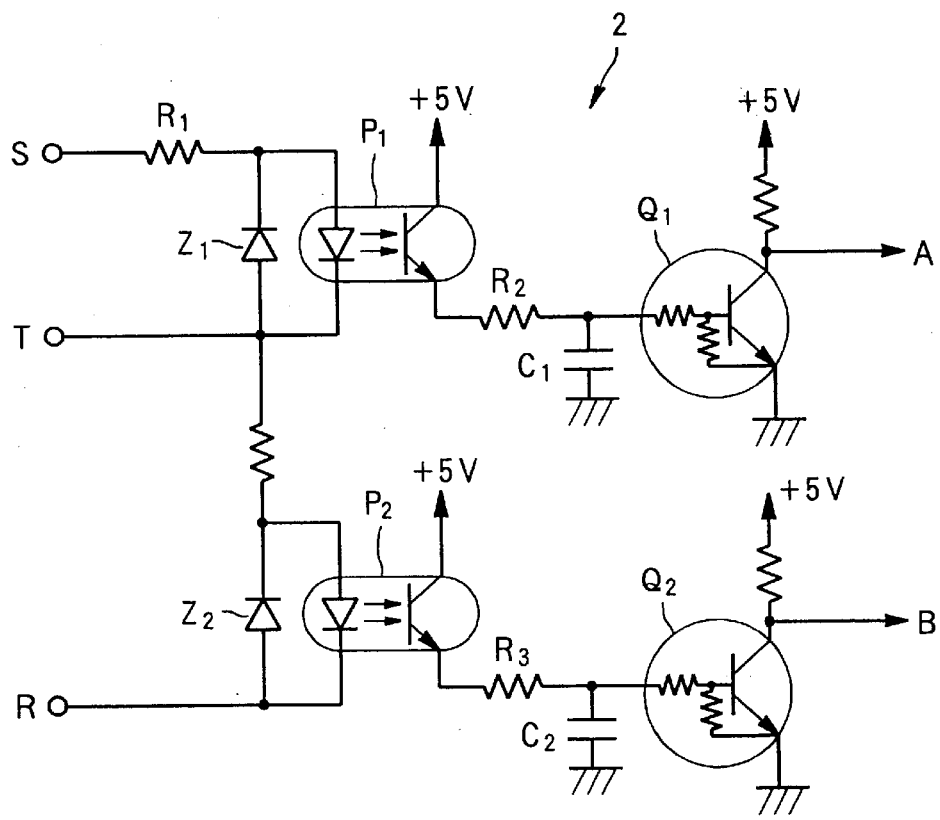
FIG. 3A  PULSE A 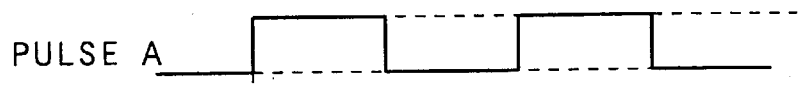
FIG. 3B  PULSE B 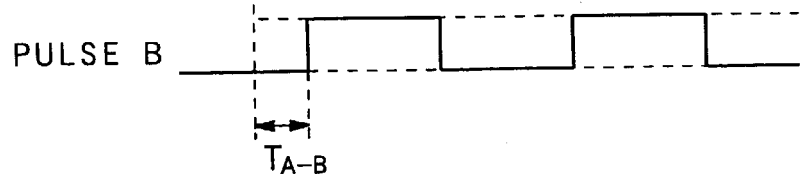
$T_{A-B}$

POWER SOURCE MISWIRING DETECTION APPARATUS

BACKGROUND OF THE INVENTION

1. Field of the Invention

The present invention relates to a power source miswiring detection apparatus for detecting a miswiring of a power source of three-phase three-wire system or three-phase four-wire system to prevent an electronic equipment connected to the three-phase power source from suffering damage, failure or the like.

2. Description of Related Art

When an erroneous wiring work is unintentionally applied to a power source of three-phase three-wire system or three-phase four-wire system, an electronic equipment using the power source may be damaged, broken down or the like. Particularly when an induction motor is used as an electronic equipment, in such an erroneous wiring situation the motor may rotate in the opposite direction to a desired direction, and it may be finally broken down. In order to prevent such a miswiring work, the respective phase wires of a power source is subjected to color-discrimination. The color discrimination is performed by coloring the respective phase wires with different colors so that the wires are visually discriminated from one another by a worker.

However, the miswiring is still unavoidable by such a conventional color-discriminating manner as described above when the miswiring is made due to a human-initiated failure (human error).

SUMMARY OF THE INVENTION

An object of the present invention is to provide a power source miswiring detection apparatus for accurately detecting a miswiring of a power source (i.e., wires of a power source are erroneously connected) to prevent an electronic equipment using the power source from suffering damage, failure or the like even when a human error is made or the like.

In order to attain the above object, according to the present invention, a power source miswiring detection apparatus for detecting a miswiring of wires of a power source, includes pulse generating means for generating a first pulse having a pulse width corresponding to a first phase difference between a first pair of two phases of a three-phase alternating power source, and a second pulse having a pulse width corresponding to a second phase difference between a second pair of two phases of the three-phase alternating power source which is different from the first pair of two phases, and judging means for detecting a third phase difference between the first pulse and the second pulse to judge whether the third phase difference is in a predetermined range, and detecting the miswiring if the third phase difference is judged to be out of the predetermined range.

The power source miswiring detection apparatus as described above may further include frequency detection means for detecting the frequency of the three-phase alternating power source, wherein the predetermined range is determined in accordance with the frequency detected by the frequency detection means.

The power source miswiring detection apparatus as described above may further include power source interrupting means for interrupting power supply of the three-phase alternating power source if the judging means judges the miswiring.

The power source miswiring detection apparatus as described above may further include alarm means for outputting an alarm if the judging means judges the miswiring.

According to the present invention, the pulse generating mens generates the first pulse having the pulse width indicating the phase difference between the input first pair of two phases of the three-phase alternating power source, and generates the second pulse having the pulse width indicating the phase difference between the second pair of two phases of the alternating power source which is different from the first pair. The judging means determines the phase difference between the first pulse and the second pulse to judge whether the phase difference is in the predetermined range, and it detects the miswiring on the basis of the above judgment. That is, when a symmetrical three-phase alternating power source is used, the phase difference is normally equal to 120°. If there is any miswiring, the phase difference between two phases is different from 120°. Accordingly, the miswiring can be detected by checking the phase difference. Some degree of dispersion may occur in detection value due to dispersion in circuit construction even when there is no miswiring. Therefore, in consideration of a detection error, a predetermined range is set to the reference (threshold) value of the phase difference for the judgment of the miswiring, and it is checked whether the detected phase difference is in this range.

Further, there are some countries such as Japan, etc. that the frequency of power (commercial power) is varied among regions, for example, both the power frequencies of 50 Hz and 60 Hz are used in Japan. Therefore, the present invention may be further equipped with the frequency detection means for accurately detecting the miswiring in accordance with the frequency of power. In this case, the reference value of the phase difference for the judgment of the miswiring is varied in accordance with the used power frequency.

Still further, the present invention may be further provided with the power source interrupting means. When the judging means judges the miswiring, the power source interrupting means interrupts the power supply from the three-phase alternating power source to protect an electronic equipment connected to the three-phase power source.

Still further, the present invention may be provided with the alarm means. When the judging means judges the miswiring, the alarm means outputs an alarm to alarm the miswiring to a worker.

BRIEF DESCRIPTION OF THE DRAWINGS

FIG. 2 is a circuit diagram showing the detailed construction of a pulse generator in the power source miswiring detecting apparatus shown in FIG. 1;

FIGS. 3A and 3B are waveform diagram showing pulses A and B which are generated by the pulse generator shown in FIG. 2;

DETAILED DESCRIPTION OF THE PREFERRED EMBODIMENTS

A preferred embodiment of the present invention will be described with reference to the accompanying drawings.

Figure 1:
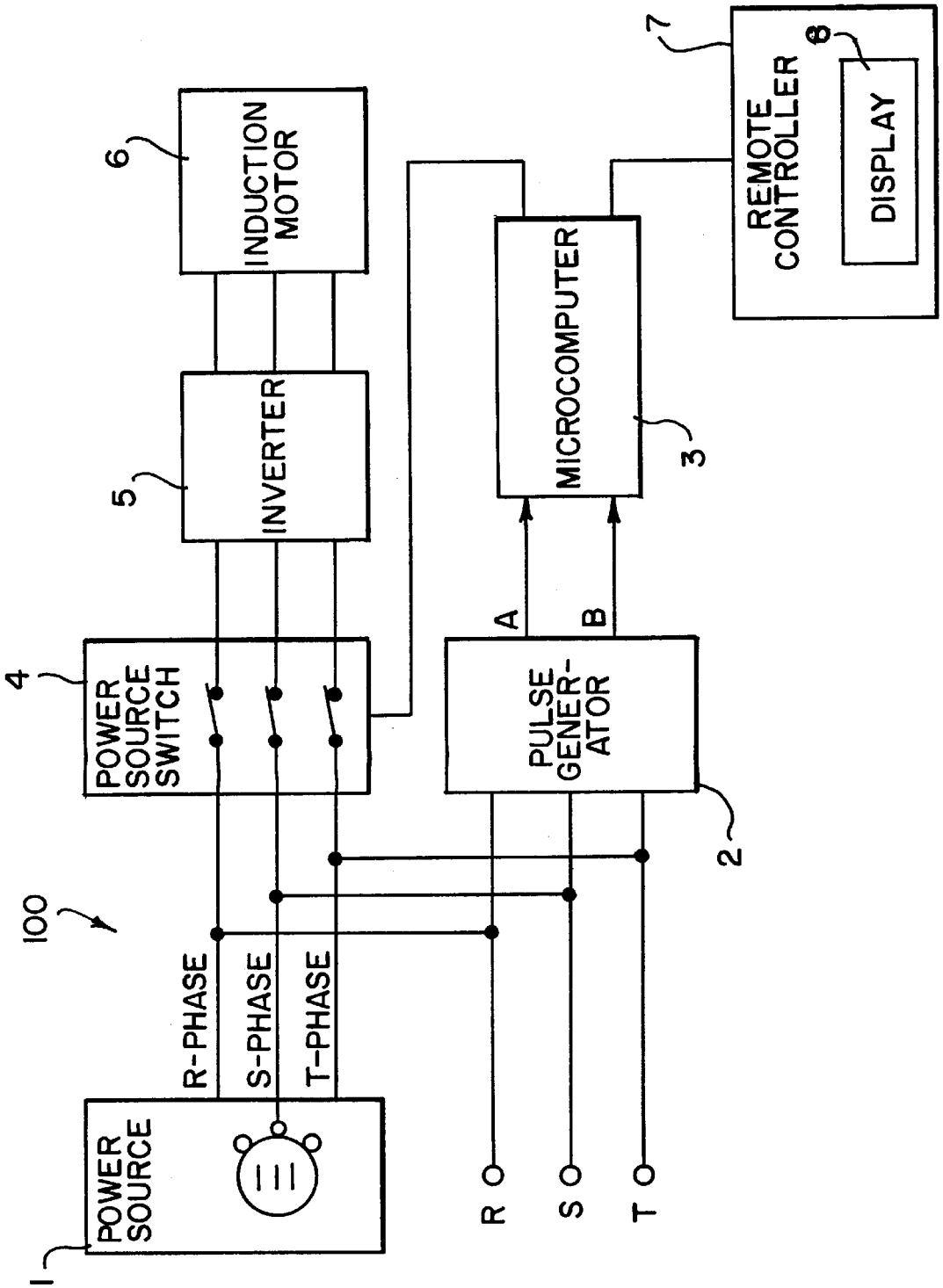
FIG. 1 is a block diagram showing the construction of a power source miswiring detecting apparatus according to an embodiment of the present invention.

FIG. 1 shows an embodiment of a power source miswiring detection apparatus according to an embodiment of the present invention. As shown in FIG. 1, The power source miswiring detecting apparatus 100 includes a pulse generator 2 which is connected to a three-phase alternating power source 1 having three phases (R-phase, S-phase and T-phase), a microcomputer 3 connected to the pulse generator 2, an inverter 5, a power source switch 4 which is controlled by the microcomputer 3 to perform an on/off operation of power supply from the alternating power source 1 to the inverter 5, an induction motor 6 connected to the inverter 5, and a remote controller 7 which is connected to the microcomputer 3 and remotely controls the microcomputer 3. The remote controller 7 has a display unit 8 such as a liquid crystal display or the like.

FIG. 2 is a circuit diagram showing the pulse generator 2 of the power source miswiring detection apparatus 100. As shown in FIG. 2, the pulse generator 2 mainly includes a first diode Z1, a first photocoupler P1, a first low-pass filter which comprises a resistor R2 and a capacitor C1 and a first transistor Q1 which are used to generate a pulse A corresponding to a pulse between two phases (S-phase and T-phase) of the three-phase alternating power source 1, and further includes a second diode Z2, a second photocoupler P2, a second low-pass filter which comprises a resistor R3 and a capacitor C2, and a second transistor Q2 which are used to generate a pulse B corresponding to a pulse between two phases (T-phase and R-phase) of the three-phase alternating power source 1. The waveforms of the pulses A and B are shown in FIGS. 3A and 3B.

The pulses A and B are generated as follows. As shown in FIG. 2, when the potential difference between the S-phase and the T-phase (i.e., the voltage waveform S-T of FIG. 5) is negative, current flows through the first diode Z1, but does not flow through a photodiode of the first photocoupler P1. On the other hand, when the potential difference is positive, current flows through the photodiode of the first photocoupler P1. At this time, a transistor of the first photocoupler P1 is responsive to light from the photodiode to be switched on, whereby the first transistor Q1 is switched on. Accordingly, the pulse A as shown in FIG. 3 is obtained at an output terminal of the pulse generator 2. Further, when the potential difference between the T-phase and the R-phase (i.e., the voltage waveform T-R of FIG. 5) is negative, current flows through the second diode Z2, but no current flows through a photodiode of the second photocoupler P2. On the other hand, when the potential difference is positive, current flows through the photodiode of the second photocoupler P2. At this time, a transistor of the second photocoupler P2 is responsive to light from the photodiode to be switched on, whereby the second transistor Q2 is switched on. Accordingly, the pulse B as shown in FIG. 3 is obtained at an output terminal of the pulse generator 2.

Figure 5:
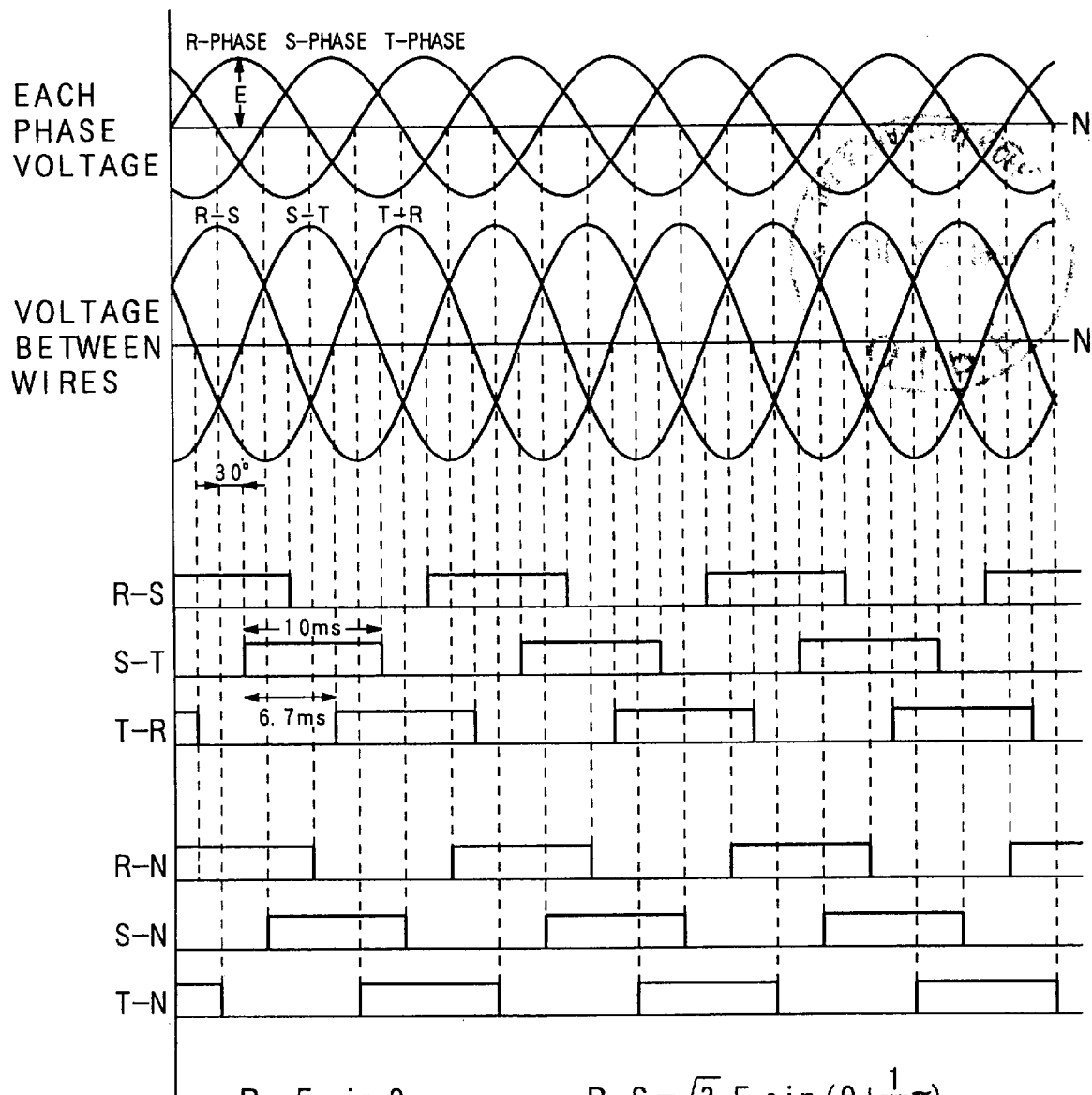
FIG. 5 is a diagram showing an alternating waveform of a three-phase power source of 50 Hz.

FIG. 5 shows alternating waveform of a three-phase four-wire system having a power source frequency of 50 Hz. In FIG. 5, an N-phase represents a neutral phase. The N-phase is generally grounded, and thus it is treated as 0V in FIG. 5.

The pulse A corresponds to a pulse between the S-phase and the T-phase, and the pulse B corresponds to a pulse between the T-phase and the R-phase (see FIG. 5). In the case of a power source of 50 Hz, the pulse width of each of the pulses A and B is equal to 10 ms (milliseconds) as shown in FIG. 5. In the case of a power source of 60 Hz, the pulse width of each of the pulses A and B is equal to 8.3 ms (not shown).

There is a time lag (phase difference) TA-B between the pulses A and B as shown in FIGS. 3A and 3B. The following table shows theoretical numeral values of the phase difference TA-B for all wiring combinations (24 wiring combinations or patterns) of the four phases (R,S,T,N) shown in FIG. 5.

| PHASE COMBINATION NO. | R S T N | PULSE A | PULSE B | PHASE DIFFERENCE TA-B 50 Hz | 60 Hz |
|---|---|---|---|---|---|
| 1 | R–S–T–N | S–T | T–R | 6.7 ms | 5.6 ms |
| 2 | R–S–N–T | S–N | N–R | 3.3 ms | 2.8 ms |
| 3 | R–T–S–N | T–S | S–R | 13.3 ms | 11.1 ms |
| 4 | R–T–N–S | T–N | N–R | 16.7 ms | 13.9 ms |
| 5 | R–N–S–T | N–S | S–R | 11.6 ms | 9.7 ms |
| 6 | R–N–T–S | N–T | T–R | 8.4 ms | 7.0 ms |
| 7 | S–R–T–N | R–T | T–S | 13.3 ms | 11.1 ms |
| 8 | S–R–N–T | R–N | N–S | 16.7 ms | 13.9 ms |
| 9 | S–T–R–N | T–R | R–S | 6.7 ms | 5.6 ms |
| 10 | S–T–N–R | T–N | N–S | 3.3 ms | 2.8 ms |
| 11 | S–N–R–T | N–R | R–S | 8.4 ms | 7.0 ms |
| 12 | S–N–T–R | N–T | T–S | 11.6 ms | 9.7 ms |
| 13 | T–R–S–N | R–S | S–T | 6.7 ms | 5.6 ms |
| 14 | T–R–N–S | R–N | N–T | 3.3 ms | 2.8 ms |
| 15 | T–S–R–N | S–R | R–T | 13.3 ms | 11.1 ms |
| 16 | T–S–N–R | S–N | N–T | 16.7 ms | 13.9 ms |
| 17 | T–N–R–S | N–R | R–T | 11.6 ms | 9.7 ms |
| 18 | T–N–S–R | N–S | S–T | 8.4 ms | 7.0 ms |
| 19 | N–R–S–T | R–S | S–N | 8.4 ms | 7.0 ms |
| 20 | N–R–T–S | R–T | T–N | 11.6 ms | 9.7 ms |
| 21 | N–S–R–T | S–R | R–N | 11.6 ms | 9.7 ms |
| 22 | N–S–T–R | S–T | T–N | 8.4 ms | 7.0 ms |
| 23 | N–T–R–S | T–R | R–N | 8.4 ms | 7.0 ms |
| 24 | N–T–S–R | T–S | S–N | 11.6 ms | 9.7 ms |

In the above table, each of the wiring combination Nos.1, 9 and 13 corresponds to a normal wiring, and the other wiring combinations correspond to the miswiring. Accordingly, as shown in the above table, when the power source frequency is set to 50 Hz, the phase difference TA–B between the pulses A and B is equal to 6.7 ms for the normal wiring. Further, when the power source frequency is set to 60 Hz, the phase difference TA–B between the pulses A and B is equal to 5.6 ms for the normal wiring. However, the phase different TA–B for the normal wiring may be deviated from the above values due to dispersion of the circuit construction. From actual measurements and experience, when the power source frequency is set to 50 Hz, the phase difference TA–B of the pulses A and B for the normal wiring may be set in a range represented by the following inequality:

$$4\ ms \leq TA-B \leq 8\ ms$$

Further, when the power source frequency is set to 60 Hz, the phase difference TA–B of the pulses A and B for the normal wiring may be set in a range represented by the following inequality:

$$4\ ms \leq TA-B \leq 6.5\ ms$$

The detection of the miswiring of the power source by the microcomputer of this embodiment is performed on the above assumption. The detailed procedure of the power source miswiring detection in the power source miswiring detection apparatus 100 of this embodiment will be described hereunder.

Figure 4:
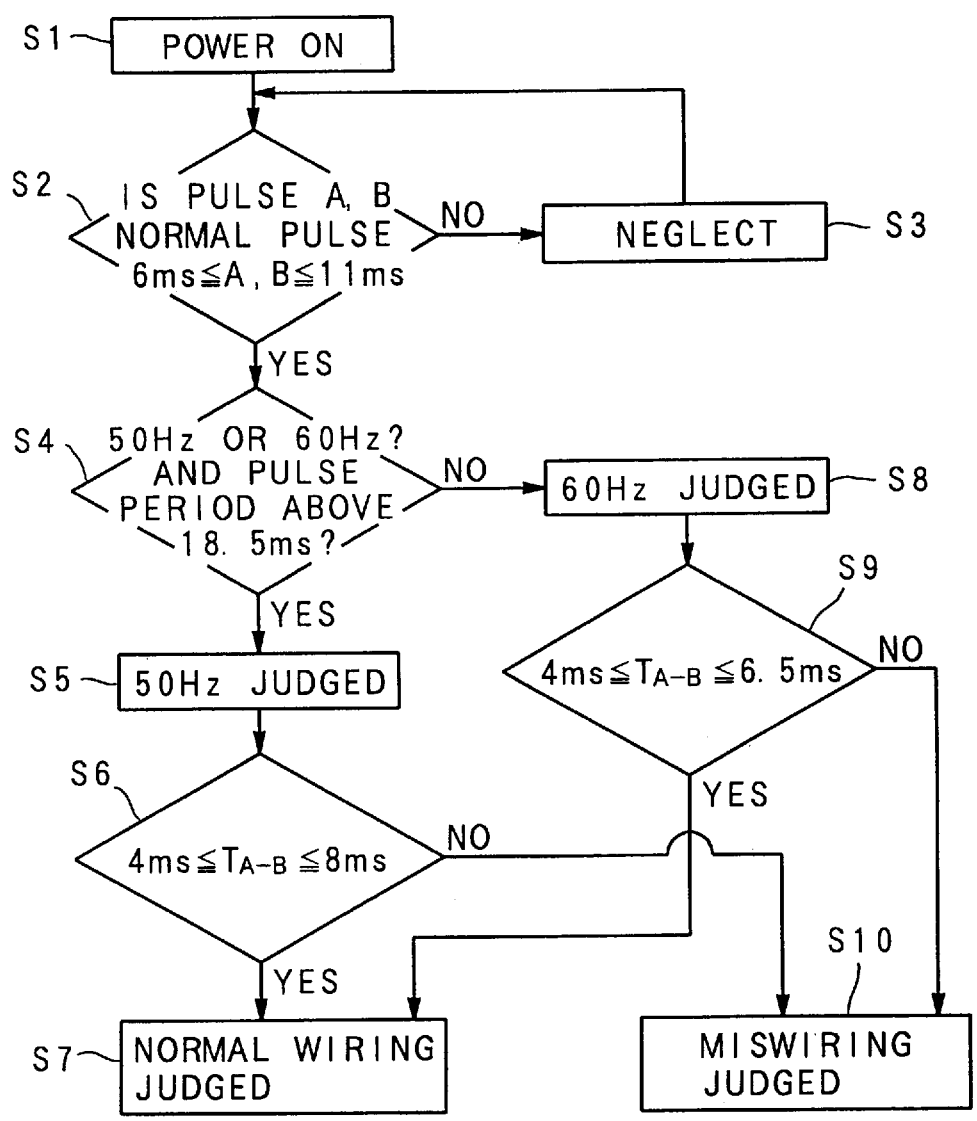
FIG. 4 is a flowchart showing a power source miswiring detecting procedure in a microcomputer of the power source miswiring detecting apparatus shown in FIG. 1.

FIG. 4 shows the power source miswiring detecting procedure of the microcomputer 3. First, upon switch-on of the power source 1 (step S1), the microcomputer 3 judges whether the pulse width WA of the pulse A and the pulse width WB of the pulse B satisfy the following inequalities, that is, the pulse widths WA and WB are set in the following ranges (step S2):

$$6 \text{ ms} \leq WA \leq 11 \text{ ms}$$

$$6 \text{ ms} \leq WB \leq 11 \text{ ms}$$

The above condition is given for the following reason. As described above, the pulse width of each of the pulses A and B is equal to 10 ms for the power source of 50 Hz, and the pulse width of each of the pulses A and B is equal to 8.3 ms for the power source of 60 Hz. That is, the value of the pulse width of each pulse is variable in a prescribed range.

If the pulse width of the pulse A, B is judged to be out of the above range ("No" judgment) in step S2, the pulse is judged not to be a normal pulse, that is, the frequency of the power source is neither 50 Hz nor 60 Hz, and thus these pulses A and B are neglected (step S3). On the other hand, if the pulse width of the pulse A, B is judged to be within the above range ("Yes" judgment), the pulse is judged to be a normal pulse and thus the process goes to step S4 to judge whether the period of the pulse is 18.5 ms or more. The value of "18.5 ms" is set for the following reason. The period of the pulse A, B is theoretically equal to 20 ms for the power source of 50 Hz, however, this value is variable in a prescribed range. The value of "18.5 ms" is introduced in consideration of the prescribed range.

If the period of the pulse is judged to be 18.5 ms or more in step S4 ("Yes" judgement), the process goes to step S5 to judge that "the power source frequency is equal to 50 Hz" because the power source frequency is set to 50 Hz.

Subsequently, the process goes to step S6 to judge whether the phase difference TA–B of the pulses A and B satisfies the following inequality: 4 ms≦TA–B≦8 ms. If in step S6 the phase difference TA–B of the pulse A,B is judged to satisfy the following inequality: 4 ms≦TA–B≦58 ms ("Yes" judgment), the wiring concerned is judged to be the normal wiring, and thus the process goes to step S7 to judge that "power source wiring is normal". However, if the phase difference TA–B of the pulses A and B is judged to be out of the range of 4 ms<TA–B<8 ms in step S6 ("No" judgment", the wiring concerned is judged to be a miswiring, and thus the process goes to step S10 to judge that "power source wiring is a miswiring".

On the other hand, if the period of the pulse is less than 18.5 ms in step S4 ("No" judgment), the process goes to step S8 to judge that "the power source frequency is 60 Hz" because the power source frequency is set to 60 Hz.

Subsequently, the process goes to step S9 to judge whether the phase difference TA–B between the pulses A and B is out of the following range: 4 ms≦TA–B≦6.5 ms. If the phase difference TA–B is within the range ("Yes" judgment), the wiring concerned is judged to be the normal wiring, and thus the process goes to step S7 to judge that "the power source wiring is normal". However, if in step S9 the phase difference TA–B of the pulses A and B is judged to be out of the following range: 4 ms≦TA–B≦6.5 ms ("No" judgment), the wiring is judged to be a miswiring, and thus the process goes to step S10 to judge that "the power source wiring is a miswiring".

If "the power source wiring is a miswiring" is judged in step S10, the microcomputer 3 outputs a switch OFF signal to the power source switch 4 to interrupt the power source 1 from the power source, whereby an electronic equipment using the power source 1 can be prevented from being damaged or broken down. Further, the microcomputer 3 outputs a display control signal to the remote controller 7 to display an alarm message indicating the miswiring on the display unit 8.

The present invention is not limited to the above embodiment, and various modifications may be made to the above embodiment.

For example, in the embodiment as described above, the induction motor is used as an electronic equipment using the three-phase power source. However, the electronic equipment to which the present invention is applicable is not limited to the induction motor, and the present invention is applicable to any other electronic equipment using a three-phase alternating power.

Further, in the embodiment as described above, when a power source wiring is judged to be a miswiring, the power source is interrupted and an alarm indicating the miswiring is displayed. In place of this indicating manner, another indicating manner such as alarm sound (buzzer or the like) may be used.

Still further, in the embodiment as described above, the three-phase four-wire system of wires having R-phase, S-phase, T-phase and N-phase is used. However, the present invention is applicable to a three-phase three-wire system.

In the foregoing description, the pulse A corresponds to a first pulse, and the pulse B corresponds to a second pulse. The microcomputer 3, the power source switch 4 and the display unit 8 constitute the miswiring detecting means. The power source switch 4 corresponds to power source interrupting means, and the display unit 8 corresponds to miswiring alarming means.

As described above, according to the present invention, the miswiring of a power source can be checked by detecting the phase difference between two phases of the power source, whereby an electronic equipment using the power source can be prevented from being damaged or broken down. In addition, even when power sources having different power frequencies are used, the miswiring can be accurately detected in accordance with the frequency of the power source.

Further, an electronic equipment which is connected to a three-phase power source can be protected by the power source interrupting means. In addition, when the power source wiring is judged to be a miswiring, the alarm means outputs an alarm to indicate the miswiring to a worker.

What is claimed is:

1. A power source miswiring detection apparatus for detecting a miswiring of wires of a power source, including:

pulse generating means for generating a first pulse having a pulse width corresponding to a first phase difference between a first pair of two phases of a three-phase alternating power source, and a second pulse having a pulse width corresponding to a second phase difference between a second pair of two phases of the three-phase alternating power source, which is different from said first pair of two phases; and judging means for detecting a third phase difference between said first pulse and said second pulse to judge whether the third phase difference is in a predetermined range, and detecting the miswiring if the third phase difference is judged to be out of the predetermined range.

2. The power source miswiring detection apparatus as claimed in claim 1, further including frequency detection means for detecting the frequency of the three-phase alternating power source, wherein the predetermined range is determined in accordance with the frequency detected by said frequency detection means.

3. The power source miswiring detection apparatus as claimed in claim 1, further including power source interrupting means for interrupting power supply of the three-phase alternating power source if said judging means judges the miswiring.

4. The power source miswiring detection apparatus as claimed in claim 1, further including alarm means for outputting an alarm if said judging means judges the miswiring.

5. The power source miswiring detection apparatus as claimed in claim 1, wherein the predetermined range is from 4 ms to 8 ms when the frequency of the power source is 50 Hz, and from 4 ms to 6.5 ms when the frequency of the power source is 60 Hz.

6. The power source miswiring detection apparatus as claimed in claim 1, wherein said pulse generating means comprises a first circuit which serves to generate the first pulse and includes a first photocoupler to which the potential difference between said first pair of two phases is applied, and a first transistor which is switched on in response to a switch-on operation of said first photocoupler, and a second circuit which serves to generate the second pulse and includes a second photocoupler to which the potential difference between said second pair of two phases is applied, and a second transistor which is switched on in response to a switch-on operation of said second photocoupler.

* * * * *